United States Patent
McDermott

(10) Patent No.: US 10,674,682 B2
(45) Date of Patent: Jun. 9, 2020

(54) TREE LIMB ROPE BRAKE

(71) Applicant: James P. McDermott, Worthington, IA (US)

(72) Inventor: James P. McDermott, Worthington, IA (US)

( * ) Notice: Subject to any disclaimer, the term of this patent is extended or adjusted under 35 U.S.C. 154(b) by 268 days.

(21) Appl. No.: 15/874,638

(22) Filed: Jan. 18, 2018

(65) Prior Publication Data
US 2018/0199523 A1  Jul. 19, 2018

Related U.S. Application Data

(60) Provisional application No. 62/448,032, filed on Jan. 19, 2017.

(51) Int. Cl.
*A01G 23/00* (2006.01)
*A01G 23/099* (2006.01)
*B66D 5/00* (2006.01)

(52) U.S. Cl.
CPC .............. *A01G 23/099* (2013.01); *B66D 5/00* (2013.01)

(58) Field of Classification Search
CPC ... B66D 5/00; B66D 5/16; B66D 5/18; A01G 23/099
See application file for complete search history.

(56) References Cited

U.S. PATENT DOCUMENTS

| | | | | |
|---|---|---|---|---|
| 2,497,220 A * | 2/1950 | Humberson | ......... | B66D 1/7447 226/193 |
| 2,929,494 A * | 3/1960 | Lombardi | ............ | A01G 23/003 226/183 |
| 3,753,551 A * | 8/1973 | Tidwell | ................ | B66D 1/7431 254/334 |
| 4,239,188 A * | 12/1980 | Hobbs | ...................... | B66D 1/60 248/637 |
| 4,314,693 A * | 2/1982 | Hobbs | ...................... | B66D 1/30 254/376 |
| 4,819,912 A * | 4/1989 | Plummer | ............. | B66D 1/7431 226/196.1 |
| 5,484,253 A * | 1/1996 | Johnson | ................. | A01G 23/00 144/24.13 |
| 5,607,143 A * | 3/1997 | Regal | ...................... | B66D 1/04 254/342 |

(Continued)

OTHER PUBLICATIONS

Hobbs Tree Limb Lowering Device, http://www.baileysonline.com/Arborist-Tree-Care/Tree-Rigging-Gear/Lowering-Devices, pp. 1-2, retrieved Feb. 21, 2018.

(Continued)

*Primary Examiner* — Emmanuel M Marcelo
(74) *Attorney, Agent, or Firm* — McKee, Voorhees & Sease, PLC

(57) ABSTRACT

A rope brake is provided for controlled lowering of a branch or limb cut from a tree by a person holding one end of the rope. The rope brake includes a drum mounted to a back plate. The back plate is mounted to the tree. The rope for lowering the branch or limb is threaded through guides on the drum and wrapped around the drum one, two or three times. One end of the rope is tied to the branch to be cut and the other end is held by the operator. When the branch is cut from the tree, the tension on the rope supplied by the operator controls the friction between the rope and the drum, such that the branch can be safely lowered in a controlled manner.

18 Claims, 5 Drawing Sheets

(56) References Cited

U.S. PATENT DOCUMENTS

| | | | | | |
|---|---|---|---|---|---|
| 5,971,363 | A | * | 10/1999 | Good | A01G 23/099 254/266 |
| 6,073,917 | A | * | 6/2000 | Plummer | B66D 1/7447 242/602.2 |
| 6,578,823 | B1 | * | 6/2003 | Johnson | B66D 1/36 242/602.2 |
| 7,458,563 | B1 | * | 12/2008 | Liu | A01M 31/02 254/334 |
| 7,556,068 | B1 | * | 7/2009 | Johnson | A01G 23/083 144/34.1 |
| 7,913,980 | B1 | * | 3/2011 | Cipriano | B66D 3/08 248/218.4 |
| 8,360,399 | B2 | * | 1/2013 | Lundrigan | B66D 3/02 254/329 |
| 2003/0071252 | A1 | * | 4/2003 | Halas | A01G 23/099 254/334 |
| 2008/0157042 | A1 | * | 7/2008 | Jacobson | B66B 9/00 254/270 |
| 2014/0341696 | A1 | * | 11/2014 | Simula | A01G 23/099 414/800 |

OTHER PUBLICATIONS

Stein Tree Limb Lowering Device, http://www.wesspur.com/rigging/stein-lowering-device.html, pp. 1-2. retrieved Feb. 21, 2018.

* cited by examiner

TREE LIMB ROPE BRAKE

CROSS-REFERENCE TO RELATED APPLICATIONS

This application claims priority to provisional application U.S. Ser. No. 62/448,032 filed Jan. 19, 2017, which is incorporated herein by reference in its entirety.

FIELD OF THE INVENTION

The invention is a crown mounted, drum type arborist rope brake designed for usage by tree pruning and removal professionals.

BACKGROUND OF THE INVENTION

A variety of rope brakes have been utilized for years by tree removal professionals to assist in the removal of trees whose limbs have grown to extend out over valuable property such as homes or fencing etc. Rope brakes give the "cutter" up in the tree a tool that allows them to tie off limbs, branches and logs and then have them safely lowered to the ground without the benefit of a crane.

Rope brakes are not needed when the tree can be felled from the ground. Rope brakes are not needed when there are no valuable or vulnerable items underneath the trees or closely adjacent to them. When there is nothing under the tree, it is fastest and easiest for the cutter (the person in the tree doing the rigging and cutting) to just cut the limbs and logs and let them harmlessly drop to the ground. Rope brakes are needed when things such as homes, smaller trees, rose gardens, fencing, gazebos, phone lines, utility boxes, swimming pools, etc. exist underneath trees and cannot tolerate having limbs and logs dropped on them. Because of this, any failure during the process of utilizing the rope brake is likely to have negative consequences such as damage to property, personal injury, or death in the statistically very dangerous profession of tree work.

Thus, rope brakes are used so that heavy limbs or logs cut by the cutter can be suspended in the crown of the tree by a rope before they are lowered slowly (generally by the hands of a belayer on the ground) to a safe spot on the ground so as to do no damage to the vulnerable items under the tree.

Drum rope brakes consist of a metallic drum (usually two to five inches in diameter and four to eight inches in length) that is securely affixed to a stationary plate or plate like apparatus that prevents the drum from spinning. The plate apparatus in turn has some component that allows for the attachment of a rope or strap that in turn enables the rope brake to be securely strapped to the trunk of a tree or tied up in the crown of the tree.

"Crown mounted" rope brakes are mounted in the crown of the tree, as opposed to the alternative "base mounted" brake which is mounted at the base of the tree.

The rope brake device must be securely attached up in the crown of the tree with rope by the cutter. After the brake has been secured to the tree, the cutter takes a long rope and wraps it around the brake drum one, two or three times. After these wraps have been taken, enough extra length of rope is drawn out from the brake drum so as to enable the cutter to reach and "tie off" the limb or log that the cutter desires to safely lower to an open area on the ground. After the log or limb has been tied off, the cutter then instructs the belayer (hypothetically one hundred and fifty pounds) on the ground to grab the opposite end of the rope hanging out of the tree and hold on securely, while moving (for safety reasons) to an area where he isn't standing under the log being cut or in the direction in which the log will swing. The cutter then proceeds to make the cut on the log (hypothetically weighing five hundred pounds) that hangs over the house or other structure. After making the cut, the weight of the dropping log begins to pull down on the rope, constricting the rope around the drum. This constriction creates friction between the rope and drum and that friction enables the lighter belayer to hold the heavier log or limb in the air. The more wraps around the drum, the more friction and the more weight that can be held. Upon direction of the cutter, or on his own discretion if he is experienced and trusted, the belayer lowers the log to the ground. Because the rope brake is up in the tree, sometimes (after the log has been stabilized) it is advantageous for the cutter to grab a hold of the rope and lower it toward the ground so that the grounds person can maneuver the slowly descending log so as to miss obstacles on the ground.

Two wraps around the drum will create more friction on the drum than one wrap and three wraps will create more friction than two wraps. Light loads need one wrap, while heavy loads need three wraps. In this situation, once the log's downward inertia has been stopped, the belayer would be able to hold the 500 lb. log in the air with just his thumb and index finger squeezing the rope. Upon direction of the cutter, the belayer lowers the log to the open area on the ground.

Rope brakes mounted at the base of the tree operate on the same principles, but as they are mounted at the base of the tree, one end of the rope can't simply be attached to a log up in the tree to be cut, or the log would just drop to the ground along with the rope attached to it. Therefore, with "base mounted" rope brakes, the cutter must first install a pulley up in the crown of the tree higher than the log to be cut. The rope from the rope brake is pulled up into the tree and ran through the pulley and then secured to the log to be cut. After the cut, the log then hangs suspended by the pulley due to the friction of the rope brake at the base of the tree. Because of the pulley's location in the tree, the force against the rope brake is upwardly vertical. This vertical force means that the base mounted drum rope brake can't just be hung from the base of the tree because the upward pull would violently flip the rope brake both upside down and backwards against the trunk of the tree. For this reason, the base mounted brake must also be extremely firmly strapped to the base of the tree with a ratchet mechanism or chained to the base with a binder to cinch the chain. The base mounted brake makes it impossible for the cutter in the tree to lower the log because the rope brake isn't between him and the log and he would not have the physical ability to hold the load without a mechanical advantage.

Whether base mounted or crown mounted, several types of problems have existed with prior art rope brakes that compromised both efficiency and safety.

No drum type rope brake has enclosed rope guides. This can lead to the rope wraps on the brake drum migrating together and cause chafing and wear on the ropes. Also, the loaded rope can overlap itself on the drum, locking the rope into place, making it impossible to lower the log from the tree, and creating the difficult and dangerous task of getting the wraps unbound while the rope is loaded without getting fingers pinched while the log or limb is hanging overhead. Also, the rope can come off the drum completely, with consequences of property damage, personal injury, or death.

The rope also can be pulled left or right and cut by the flanges of the rope brake, that are similar in appearance to snatch blocks.

The lack of enclosed rope guides means that if a rope brake flips upside down, backwards and sideways, (which happens for a variety of reasons), the rope is able to get out of place on the drum or pulled off the drum completely.

If the rope is pulled off of the drum completely, catastrophic results can occur immediately. For example, log can drop straight down through the customer's roof and into their house. If the rope comes off as the log is swinging, the log can become a flying projectile that is extremely dangerous to anyone or anything in the vicinity of the tree.

When rope wraps around a drum migrate together, the rope against rope contact under loaded conditions causes excessive and often unnoticeable wear on the rope, compromising the rope's strength for future applications, which is dangerous.

When rope wraps get overlapped on themselves under a load, the pinching point between the two ropes has the effect of literally locking the rope in place. This doesn't simply make the lowering of logs or limbs impossible, it creates a situation that is dangerous in several ways. As the rope is under a load, without a crane, there is no way to get the overlapped rope undone from itself and back into position without the belayer getting his hands and finders perilously close to a loaded and dangerous pinch point with a risk of cutting off fingers, braking fingers or causing severe rope burns. If the crew is using a "base mounted" rope brake, the belayer on the ground will also possibly either be standing directly or nearly directly under the heavy log or long limb which they are trying to safely lower as he tries to accomplish the difficult task of getting the rope unbound without getting his fingers pinched or losing control of the rope.

Several types of problems have existed with prior art crown rope brakes that compromised both efficiency and safety. In the process of attaching various devices to the tree, none have been designed to allow for tensionless hitch rope attachments. Subsequently, a weaker and more time consuming method of attachment to the tree has been required. None have allowed for the creation of an inverted basket hitch, a method of lifting with a rope or sling that has long been known to effectively double the work load capability of the rope or sling doing the lifting and no prior art brakes have enabled two attachment points.

Another concern with prior art "crown mounted" units is that they do not have the safest and quickest means of attachment to the trunk of the tree. Prior art crown mounted rope brakes have all been designed to hang from one end of one rope. Thus, an attachment rope must be wrapped around a limb or trunk of the tree and then secured with a "rope against rope knot" to itself, such as a quick and easily made, running bowline knot. The "rope against rope knot" in this form of usage is less than ideal because of the friction and abrasion that is created at the point where two crossing sections of rope chafe as they come together. This is a known problem with knots, but it is made worse in this application because the load the rope is bearing is neither stagnant nor are the blunt forces against it singular. In this application, the exact same points in the rope may well have to take the blunt force from many tied off limbs or logs of unknown weights, and the force and the chaffing on the rope is increased, often dramatically, because the logs and limbs are dropping before they are "caught" by the rope. Prior art designs also have required two knots at different vertical elevations for attachment to the tree, which requires more distance between the attachment point to the tree and the drum. This means there will be a greater vertical drop of the log if it has been cut from above the rope brake, increasing the force the rope must catch. The rope may or may not fail immediately at the attachment point, but it will be made weaker than the rest of the rope and will need to be replaced sooner, and if it isn't replaced in time, an accident is predictable. Also, the more elevation drop there is, the more jolt there is on the rope brake, on the rope attached to the tree, on the lowering rope, and to the branch supporting the climber with running chainsaw in hand. The greater the jolt on the trunk of the tree, the greater the trunk reverberates. If the cutter is in an aerial lift device bucket, the more reverberation there is, the more likely he is to have the reverberating log come back and hit him in the face or smash his fingers on the edge of the bucket.

Another concern with previous attachment designs of crown mounted brakes is the hanging rope attached to a singular connecting point on the top of the rope brake. Because of the one point of attachment, 100% of the load's force is on that one hanging rope and that one attachment point.

Aside from safety issues, the two knots required by prior art "crown mounted" rope brakes consume time and energy, especially in those situations where the cutter desires to frequently move the rope brake around the crown of the tree. Tying the rope brake to a hanging rope necessitates that the cutter hold onto the rope brake to keep it aloft almost continually while tying the knot to keep the weight of the rope brake off the rope he is attempting to tie. One prior art crown mounted device disassembles (similar to a snatch block), but it is designed to be attached to the tree trunk a single spliced eyelet and has edges capable of cutting a loaded rope when the rope is pulled at conflicting angles. This can especially occur when the apparatus is pulled tightly backward toward the trunk of the tree, which in turn prohibits the brake from rotating directly in line with the load. It is then that the loaded rope can be gouged or cut by the flange of the apparatus. Furthermore, a snatch block type device not only has moving parts, but the strength of the device is entirely reliant upon pins, bolts and nuts that can develop hairline cracks and require disassembly of the device for inspection. There are no prior art horizontally affixed drum mounted rope brakes that have no moving or removable parts and no sharp edges.

Therefore, there is a need to improve rope brakes for use in tree trimming and tree removal.

Accordingly, a primary objective of the present invention is the provision of a rope brake which overcomes the problems of the prior art.

Another objective of the present invention is the provision of an improved rope brake used for tree trimming and tree removal.

Still another objection of the present invention is the provision of a rope brake having guides through which the rope extends without overlapping.

Yet another objective of the present invention is the provision of a tree brake having a cylindrical drum around which the rope is wrapped and having channels to prevent the rope from chafing against itself during use.

Yet another objective of the present invention is the provision of a rope brake having a drum mounted to a back plate, with mounting bars extending laterally outwardly from opposite sides of the back plate to tie the brake to the tree.

Another objective of the present invention is the provision of a method of lowering a branch cut from a tree using a rope brake around which a rope wraps without overlapping, with one end of the rope tied to the branch to be cut and the opposite end held under tension by an operator who controls lowering of the branch after the branch is cut from the tree.

Another objective of the present invention is the provision of a rope brake made with a one-piece, unitary construction and no moving parts.

Still another objective of the present invention is a provision of a rope brake which is free from sharp edges so as to extend the life of the rope used with the brake.

Yet another objective of the present invention is a provision of a rope brake assembly including a cylindrical drum with a back plate for mounting the drum to the tree, and a rope wrapped around the drum and through a plurality of rope guides or channels to prevent the rope from overlapping upon itself during use.

A further objective of the present invention is the provision of a rope brake which is easy and safe to use, which minimizes or eliminates excessive wear on the rope during usage, and is economical to manufacture.

These and other objectives will become apparent from the following description of the invention.

SUMMARY OF THE INVENTION

A tree trimming rope brake is provided for controlled lowering by an operator of a limb cut from a tree. The brake includes a cylindrical body or drum which extends forwardly from a back plate. The back plate includes a bar or bars extending laterally outwardly in opposite directions to which a first rope is tied for mounting the rope brake to the tree. A pair of rope guides are mounted on the drum in spaced apart relation so as to define channels through which a second rope is threaded such that the second rope wraps around the drum. One end of the second rope is tied to the branch to be cut and the second end is held with tension by an operator. When the branch is cut, the weight of the branch and the tension by the operator creates friction between the drum and the second rope. The operator can reduce the tension, and thereby reduce the friction, such that the branch can be slowly and easily lowered to the ground as the second rope slides around the drum and through the rope guide channels.

DESCRIPTION OF THE INVENTION

Figure 1:
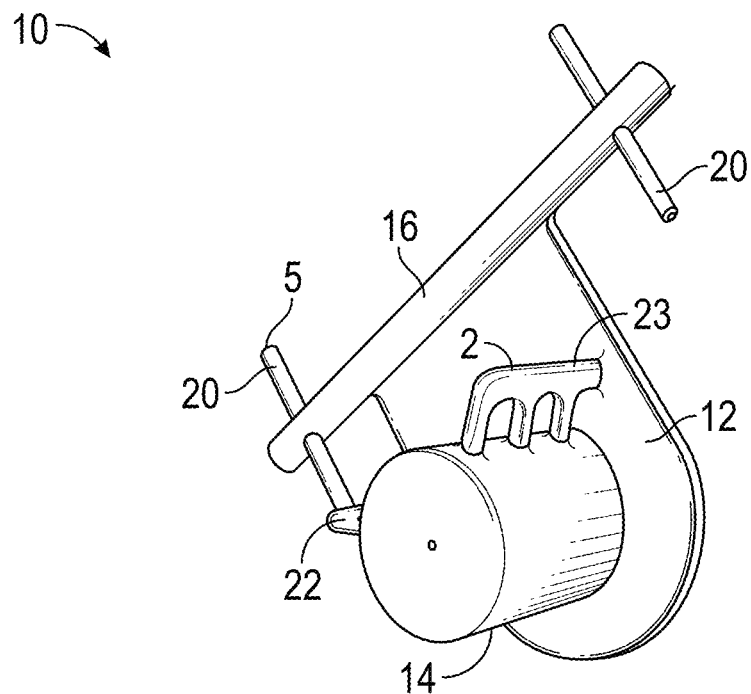
FIG. 1 is a perspective view of the rope brake of the present invention, from a lower right position.

The rope brake of the present invention is generally designated by the reference numeral 10 in the photographs. The brake includes a back plate 12 with a cylindrical drum 14 extending forwardly from the plate 12. A double T bar 16 is welded to the top of the back plate 12 and extends beyond the back plate. A safety pin or dog ear 20 extends through the outer ends of the T bar 16 so to prevent a mounting rope 18 from sliding off the bar 16.

Figure 2:
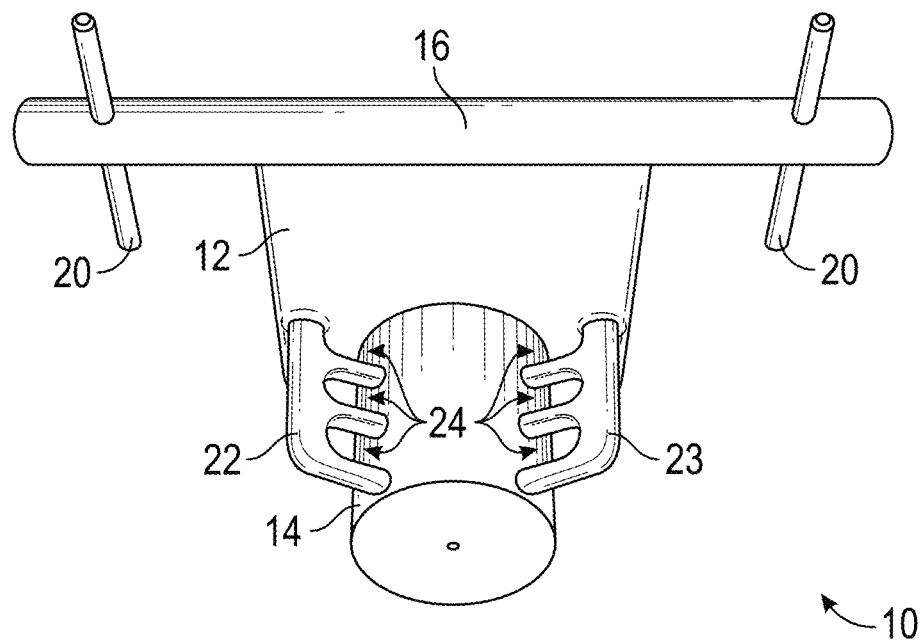
FIG. 2 is a perspective view of the rope brake from an upper position.
Figure 3:
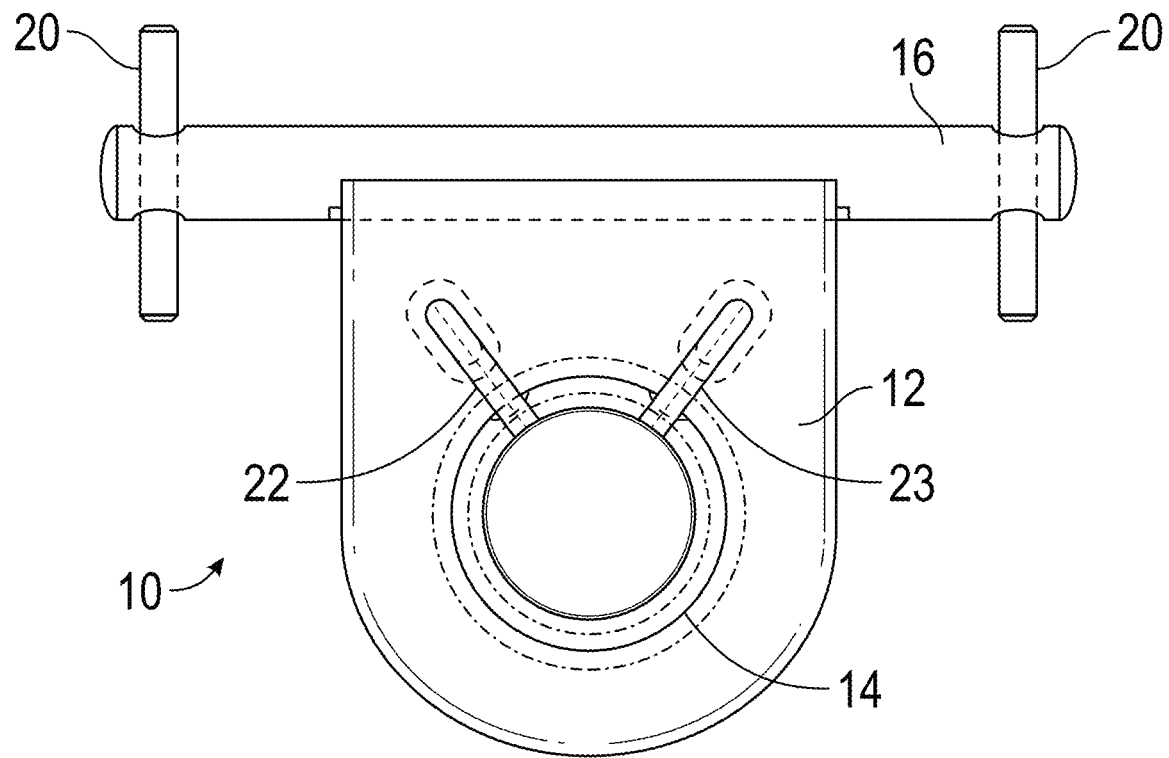
FIG. 3 is a front elevation view of the rope brake of the present invention.
Figure 4:
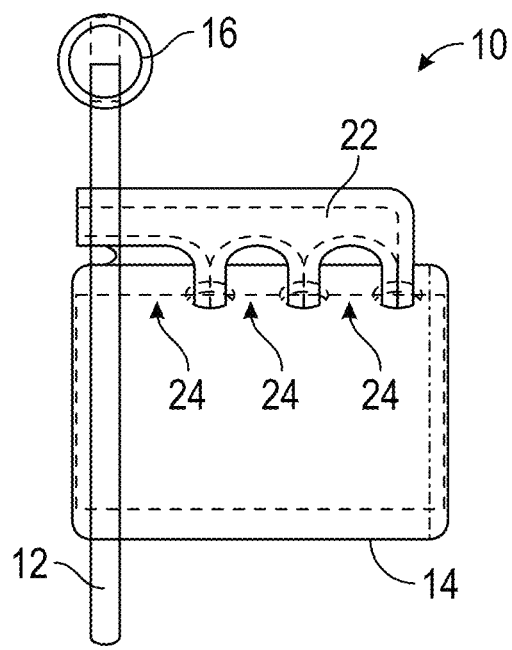
FIG. 4 is a side elevation view of the rope brake.
Figure 5:
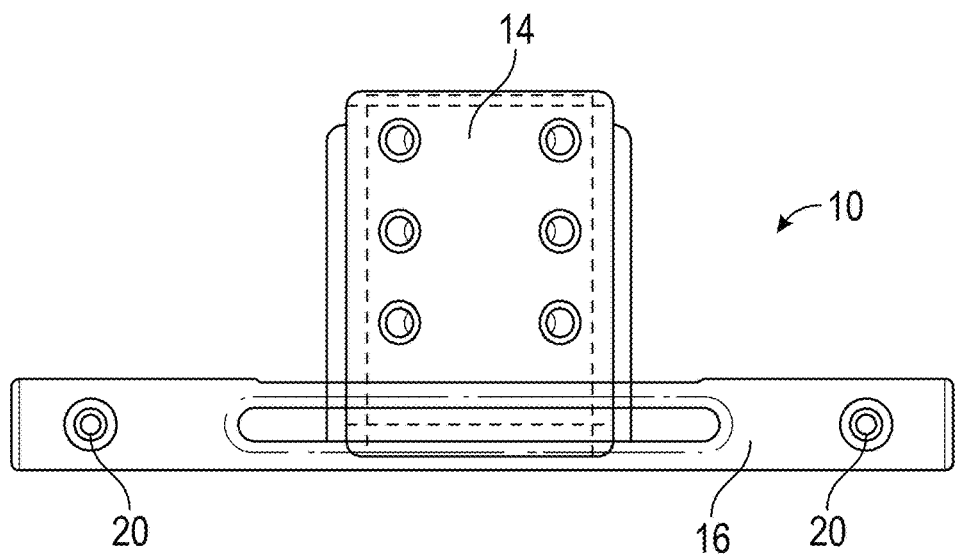
FIG. 5 is a top plan view of the rope brake.
Figure 6:
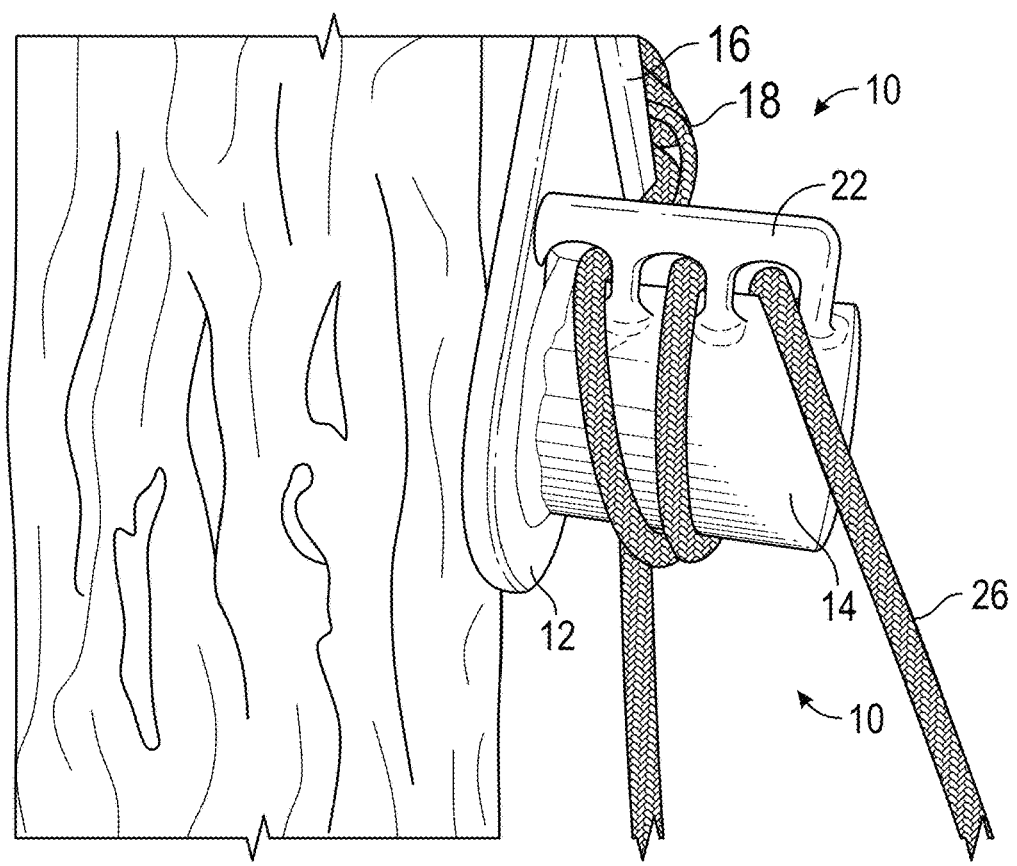
FIG. 6 is a side view of the brake.
Figure 7:
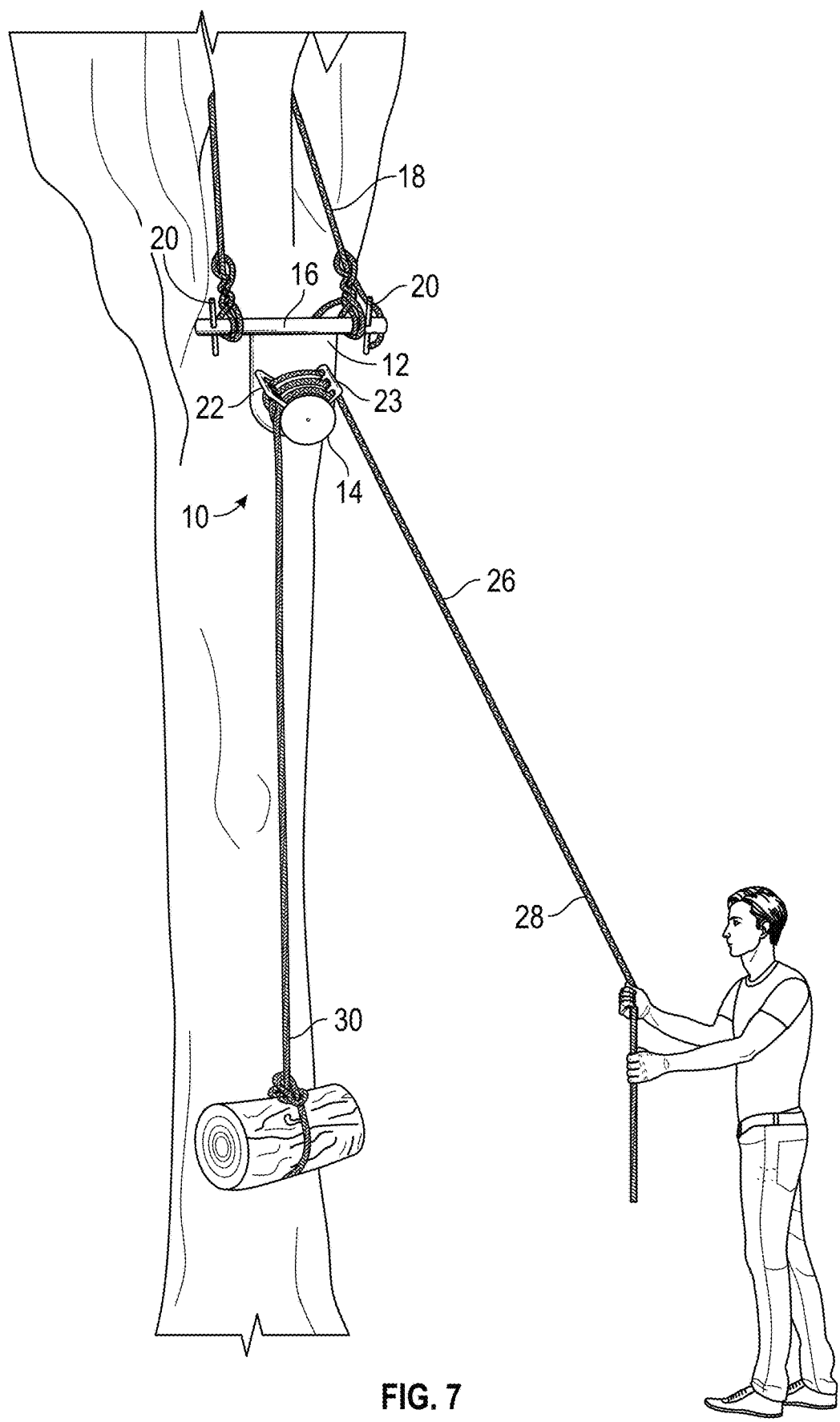
FIG. 7 is a view showing the use of the brake, according to the present invention.

A pair of rope guides 22, 23 are welded to the drum 14 so to define a plurality of channels 24 through which a second rope 26 extends. As seen in the FIGS. 1-3, the guides 22, 23 are spaced apart approximately 90 degrees on the drum 14, and are welded to both the drum 14 and to the back plate 12. In the preferred embodiment, there are three channels 24 formed by each guide 22, 23. However, it is understood that more or fewer channels can be provided on the brake 10. As seen in FIG. 7, the rope 26 is wrapped around the drum 14 with one end 28 extending through the right guide 22 and the opposite end 30 extending through the left guide 23, such that the rope 26 does not overlap itself as the rope 26 winds around the drum 14. The drum 14 and guides 22, 23 are free from sharp edges, so as to avoid damage to the rope 26.

Preferably, the brake 10 is made of aluminum, or other light weight yet strong material, so as to minimize the weight being hauled up the tree. The brake 10 is intended to be secured to the tree trunk at any desired height above the ground.

In use, the brake 10 is secured at the desired height on the tree by the mounting rope 18 tied to the T-bar 16 by taking several wraps around the T-bar before securing with two half hitches or any method to secure the rope. The second, and longer rope 26 is threaded through the channels 24 and wrapped around the drum two or three times, depending upon the weight of the limbs to be lowered. The end 30 of the rope 26 is tied to the limb to be cut and lowered, while the other end 28 of the rope 26 is controlled by an operator, such as a person in a lift bucket, or a person on the ground. The friction of the rope 26 on the drum 14 allows the person holding the second end of the rope 26 to easily control lowering of the tree limb or branch after the limb or branch is cut from the tree. A log weighing several hundred pounds can easily be lowered using the brake 10. The guides 22, 23 and channels 24 preclude the rope 26 come overlapping itself of the drum 14. Thus, wear or damage to the rope 26 can be minimized, and the rope 26 will not accidentally become locked against movement around the drum 14.

The dog ears 20 of the T bar 16 and rope 18 provide a self-leveling ability for the brake 10 on a tree trunk. Thus, as the tree branch or log weight on rope 26 pulls on the drum 14, the back plate 12 will automatically pivot or adjust on the rope 18, without risk of detachment from the tree trunk.

It is understood that the brake 10 can also be used with a pulley spaced apart on another portion of the tree, as needed to control the lowering of the tree branch. The number of wraps of the rope 26 around the drum or spindle depends upon the weight of the branch to be lowered, the weight and strength of the person of the other end of the rope.

The rope brake 10 has a simple construction, with a one-piece design, and with no removable bolts or pins. Thus, the brake 10 is easy to inspect on a daily basis to ensure integrity and lack of any hairline cracks or other weaknesses.

The attachment bar 16 at the top of the device 10 is the component of the device that enables it to be attached to the trunk of the tree, with several advantages over prior art. The open ended configuration enables the brake to be attached to the tree at two separate points on either side of the device 10 with tensionless rope hitches on the attachment bar 16. The tensionless hitch is the only type of knot connection that does not lessen the rope strength rating by thirty percent or more. Also, as there are two attachment points for the rope 18, each knot and each attachment point on the device 10 only takes one half of the brunt force of the falling limb or log.

As the rope 18 is first tied off to one side of the double T attachment bar 16 with a tensionless hitch, then wrapped around the tree and then tied to the other side of the attachment bar with a tensionless hitch, an inverted basket hitch has been created. A basket hitch is a well known lifting configuration (typically used with slings in crane work) that serves to double the strength rating of any given rope or sling.

By having two rope attachment point or opposite ends of the bar 16, the rope strength is effectively doubled and the wear at the attachment point is approximately 50% because the force against it is cut in half. With two attachment points, the rope 18 is typically left affixed to the side of the dog ear attachment's component toward the cutter's weak hand. The cutter then simply loops the rope around the trunk of the tree once or twice and then raps the tail of the rope 18 around the other side of the dog ear rope attachment component a couple of times and secures with two half hitches. The blunt force of the load is never on two points of rope contacting one another, but rather is on the underside of the smooth 1.5" diameter rod 16, and thusly solves the issue of excessive rope chafing, as well as adding to the relevant strength and safety of the connection.

Thus, the double "T" attachment bar 16 enables a stronger, safer, easier and faster means to attach a drum mounted rope brake in the crown of a tree.

The completely enclosed rope guides 22, 23 prevent the wrap sections of the rope 26 from migrating together around the drum 14, (causing excessive rope wear), overlapping, coming off the device 10 completely, and preventing the rope from being severed by sharp edges on the device in situations where the device is yanked around in any direction. In a business in which rope failure can possibly cause death or serious injury, and can lead to property damage, the enclosed rope guides 22, 23 (combined with the fact there are no sharp edges on the device) prevent excessive rope wear and make the device 10 safer and closer to accident proof. The enclosed rope guides 22, 23 are also designed to perform as gussets to further strengthen the attachment between the brake drum 14 and the main attachment plate 12.

Figure 8:
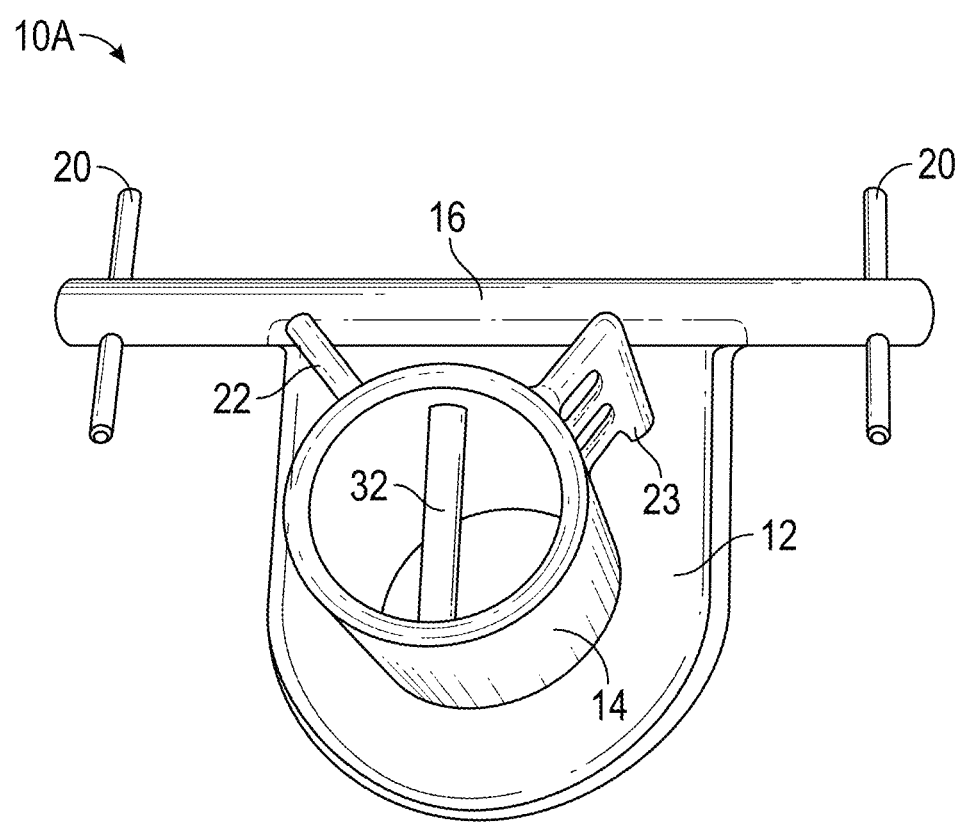
FIG. 8 is a perspective view of an alternative embodiment of the rope brake, according to the present invention.

FIG. 8 shows another embodiment of the rope brake 10A, which is substantially identical to the rope brake 10 shown in FIGS. 1-7, but with the addition of a vertical post 32 fixed within the cylindrical drum 14, which has an open front end. The rope brake 10A is adapted to be tied to a tree, including a horizontal branch of a tree, with a third rope being wrapped around the post 32 and then around the tree branch or tree truck to stabilize the brake 10A against rotation during use. Without the stabilization effect of the third rope, if the rope brake 10 is tied to a horizontal branch, it may have a tendency to tilt or rotate forwardly due to the weight of a log or branch being lowered such tilting causes the rope 26 to slide with increased friction, thus causing excessive wear on the rope 26.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A tree trimming rope brake, comprising:
   a back plate configured to be mounted on a tree;
   a drum extending forwardly from the back plate, for a rope to wrap around the drum;
   rope guides on opposite sides of the drum and through which the rope is adapted to extend to preclude the rope from overlapping itself on the drum; and
   each rope guide having a plurality of channels to receive sections of the rope.

2. The tree trimming rope brake of claim 1 further comprising a bar extending laterally outwardly beyond opposite sides of the back plate for securing the back plate at two spaced apart points to the tree using a second rope.

3. The tree trimming rope brake of claim 2 wherein the back plate, rope guides and bars are formed as unitary piece.

4. The tree trimming rope brake of claim 2 wherein the bar has opposite ends with a pin extending therefrom to retain the second rope on the bar.

5. The tree trimming rope brake of claim 1 wherein the drum has an axis perpendicular to the back plate.

6. The tree trimming rope brake of claim 1 wherein the rope guides are attached to the drum and to the back plate.

7. The tree trimming rope brake of claim 1 wherein the rope guides are spaced apart approximately 90° from one another.

8. The tree trimming rope brake of claim 1 further comprising a post fixed inside the drum and adapted for a third rope to wrap around for stabilization of the rope brake in the tree.

9. A method of lowering a branch cut from a tree, comprising:
   tying a rope brake to the tree using a first rope;
   wrapping a third rope to a post inside the body and tying the third rope to the tree;
   threading an end of a second rope through rope guides on a cylindrical body of the brake and wrapping the second rope around the body to prevent the second rope from chafing against itself; then
   tying one end of the second rope to the branch to be cut;
   an operator holding an opposite end of second rope with tension; then
   cutting the branch from the tree; then
   the operator relieving some of the tension on the second rope such that the second rope slides around the body to lower the branch.

10. The method of claim 9 wherein the second rope is wrapped around the body one, two or three times.

11. The method of claim 10 wherein the tension is adjusted to increase and decrease friction of the rope on the brake body.

12. The method of claim 10 wherein the first rope extends around the tree and is attached to the rope brake using hitch knots.

13. A rope brake assembly for lowering a limb cut from a tree, comprising:
   a cylindrical drum;
   a back plate on drum for mounting the drum to the tree;
   a plurality of rope channels on the drum;
   a first rope adapted to extend through the channels and wrap around the drum without overlapping;
   the first rope having one end adapted to tie around a limb to be cut and a second end adapted to be held by an operator to control lowering of the limb; and
   a post fixed inside the drum and adapted for a second rope to wrap around for stabilization of the rope brake in the tree.

14. The rope brake assembly of claim 13 wherein friction between the first rope and the drum is controlled by the operator.

15. The rope brake assembly of claim 13 further comprising a pair of mounting bars extending laterally outward opposite one another from the back plate for tying the back plate to the tree.

16. The rope brake assembly of claim 15 further comprising pins on ends of the mounting bars to prevent a mounting rope from shipping off the bar.

17. The rope brake assembly of claim 13 wherein the channels are formed in a pair of guides spaced approximately 90° apart.

18. The rope brake assembly of claim 13 wherein the first rope is enclosed between the drum and the channels.

* * * * *